Patented Feb. 20, 1934

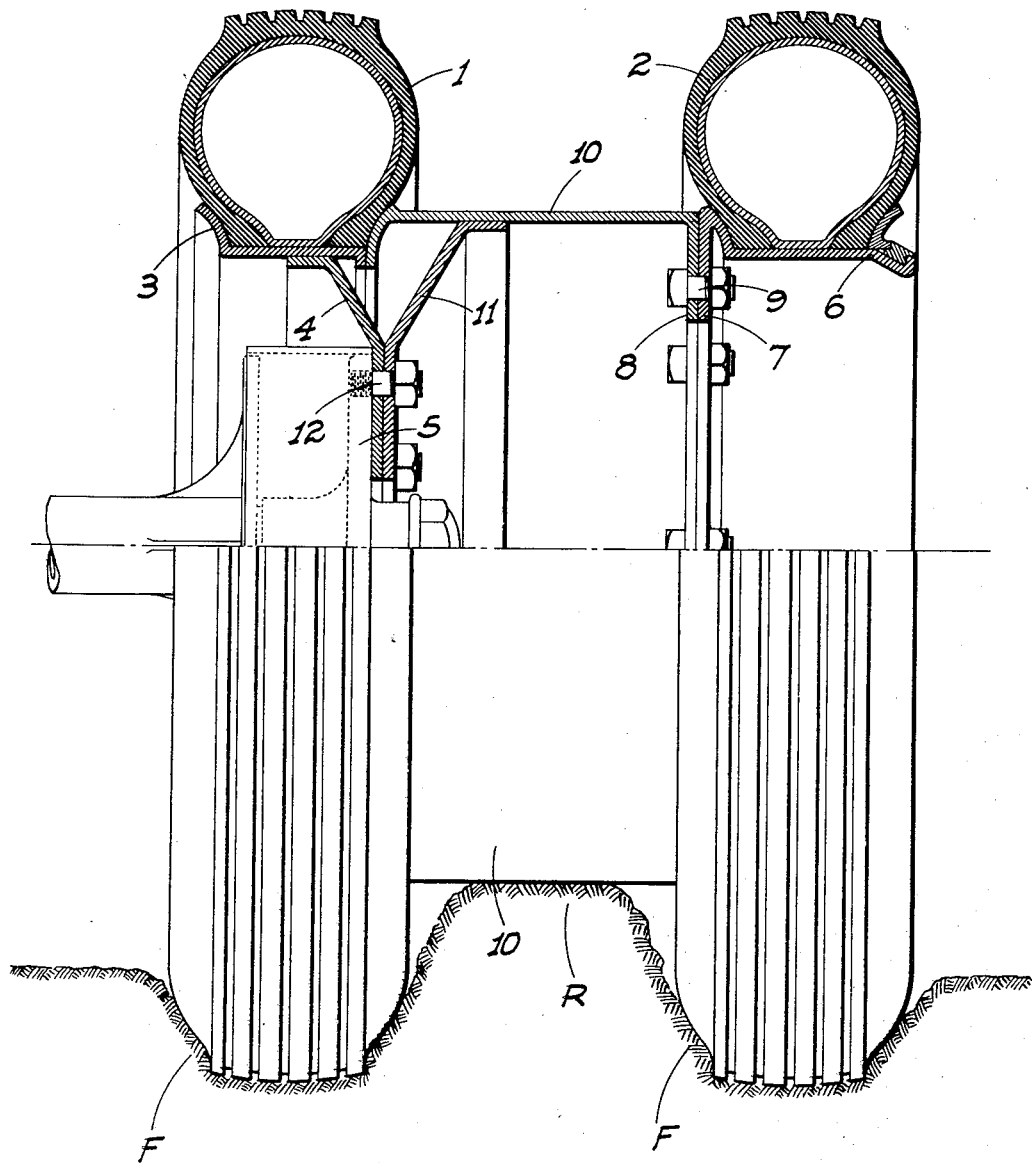

1,948,136

UNITED STATES PATENT OFFICE 1,948,136

DUAL TIRE WHEEL

Gordon F. Scheckler, Stockton, Calif., assignor of one-half to Roscoe C. Zuckerman, Stockton, Calif.

Application December 30, 1930
Serial No. 505,505

1 Claim. (Cl. 301—38)

This invention relates to motor vehicles, and particularly to trucks and the like which are equipped with dual tire wheels. The advantages of the dual wheel arrangement are well known, but I have found that as such wheels are commonly arranged these advantages are somewhat nullified when operating over soft ground and supporting a heavy load. Under such conditions the wheels sink into the ground and then merely tend to slip around.

The principal object of my invention is to provide a dual wheel arrangement in which the wheels are so mounted relative to each other that the traction is maintained when operating in soft ground to practically as great a degree as when the wheels are engaged with pavement or a hard surfaced road.

A further object of the invention is to provide a simple and inexpensive device and yet one which will be exceedingly effective for the purpose for which it is designed.

These objects I accomplish by means of such structure and relative arrangement of parts as will fully appear by a perusal of the following specification and claim.

The figure on the drawing is an end elevation, one-half in section, of my improved dual wheel mounting arrangement showing the action or effect of the weight of the wheels and their load on soft ground.

Referring now more particularly to the characters of reference on the drawing, 1 and 2 denote the inner and outer tires of the dual wheel arrangement. The inner tire is mounted on a rim 3 which is removably connected by a web 4 to the flange 5 to which the driving axle of the vehicle is connected as usual. The tire 2 is also mounted on a rim 6 separate from the rim 3. Instead of the two tires being in close proximity to each other as is usually the case however I space them a considerable distance apart.

The spacing which has been found to give the best results is approximately the width of the tire; and this being the case, the actual spacing will be proportionately greater in a large size tire wheel unit, and a consequently large and heavy vehicle, than in a small size tire unit and vehicle.

To rigidly yet removably connect the wheels together and maintain them in the desired spaced relation the rim 6 is provided on the inside with an annular flange 7 which engages a similar flange 8 and is removably secured thereto by bolts 9. The flange 8 projects inwardly from a rigid drum or wide band 10 which extends between the rims 6 and 3 and is substantially the same diameter as the tire engaging rim flange. The drum is provided with a web 11 welded thereto and which abuts against the web 4 and is removably secured to the flange 5 by bolts 12.

By reason of this arrangement of the wheels in connection with the intermediate drum it will be seen that if the vehicle is operating over soft ground, the wheels will sink into the ground. This will cause furrows to be made which engage not only the treads of the tires but both side walls of the same as well. The depression of the wheels into the ground compresses the ground between the wheels upwardly in the form of a ridge R, which of course is relatively wide owing to the spacing between the tires. The sides of the ridge being engaged by and pressing against the corresponding side walls of the tires, provide additional and relatively solid traction surface. With the tires in close side by side order, as at present arranged, on the other hand, the amount of dirt squeezed between the tires is so small that it cannot possibly form a compact and relatively solid body, and therefore provides no additional traction surface.

In addition if the load on the vehicle is sufficiently great, or if the dirt is sufficiently soft to cause the wheels to sink relatively deep in the ground, the central dirt ridge will be forced up to such an extent as to engage the drum 10, as shown in the drawing, and said drum then in effect forms a third wheel. The traction then extends practically unbroken from one to the other of the two wheels as well as across the treads of the latter. I have found from actual practice that a vehicle equipped with my improved dual wheel arrangement is able to haul a 50% greater load over soft ground, than the same vehicle with a corresponding load, but with the closely associated and ordinary dual wheel arrangement.

It is to be understood that the particular rim and mounting arrangement of the tires has been shown for the purposes of illustration only and any desired or standard type may be used. The feature of my invention resides in the relatively wide spacing of the tires and the provision of the ground engaging drum therebetween.

From the foregoing description it will be readily seen that I have produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

A dual wheel structure for motor vehicles comprising laterally separated inner and outer tire-rims, a drum extending between the rims, cooperating flanges about the adjacent ends of the drum and outer rim, means detachably connecting said flanges, a flange on the inner end of the drum forming the outer tire engaging flange of the inner rim, other cooperating flanges supported from the drum and inner rim, and means detachably connecting said last named flanges together.

GORDON F. SCHECKLER.